No. 417. REISSUED DEC. 23, 1856.

J. G. McNAIR.

MANUFACTURING CARPETS.

UNITED STATES PATENT OFFICE.

JOHN G. MACNAIR, OF NORWICH, CONNECTICUT.

IMPROVEMENT IN MANUFACTURING CARPETS.

Specification forming part of Letters Patent No. 13,395, dated August 7, 1855; Reissue No. 417, dated December 23, 1856.

*To all whom it may concern:*

Be it known that I, JOHN G. MACNAIR, of Norwich, New London county, and State of Connecticut, have invented a new and useful Improvement in the Manufacture of Carpets, of which the following is a full, clear, and exact description, reference being had to the accompanying drawings, making part of this specification, in which—

Figure 1:
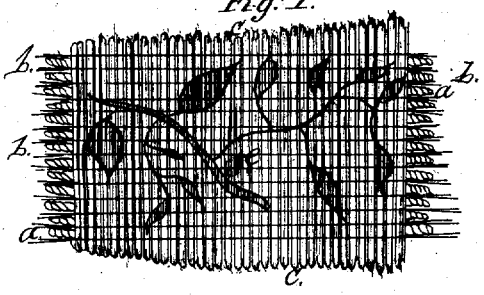
Figure 2:
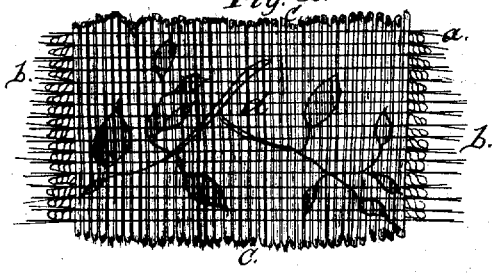
Figure 3:
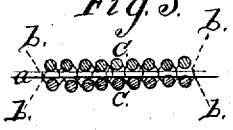
Figure 4:
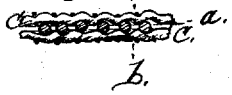

Figure 1 represents the upper face of the fabric; Fig. 2, the under face thereof; Fig. 3, a longitudinal, and Fig. 4 a cross, section.

The same letters indicate like parts in all the figures.

The object of my invention is to produce a fabric having a figure on the two surfaces like what is known as the "ingrain" carpets, with the colors of the figure reversed, but without a figuring-warp; and my said invention consists in producing the said fabric by means of a double weft, one or both of which are party-colored, in combination with a dividing and ingraining warp operated by the jacquard or equivalent therefor, and which divides the upper from the lower weft, and permits it to ingrain or appear, as the design may require, upon either face of the fabric at the same time, giving body to the fabric when these are combined with a binding, in warp operated by the harness, and which in binding in the weft-threads draw them down between the dividing-warps, forming a rib-like pile on both faces with the ribs running in the direction of the length of the fabric.

In mounting a loom for the production of my said new fabric, I first mount a set of twine or coarse-thread warp, *a*, which is connected with and operated by a jacquard or other equivalent figuring apparatus. Between the threads of the warp *a*, I interpose a binding-in warp, *b b*, of finer thread, connected with and operated by the usual harness or equivalent therefor, which is operated for each pick or throw of the shuttle. The woven weft *c c*, mounted in two shuttles operated alternately, is one or both party-colored, as heretofore, for the production of figured fabrics, so that in producing such parts of the design as consist of two colors only—such as maroon and scarlet, as at *d* and *e*, Figs. 1 and 2, one weft-thread shall be maroon and the other scarlet for a sufficient length to produce so much of the design as is composed of these two colors—each weft-thread alternately appearing on the upper and under surface, which is determined by lifting up or letting down certain portions of the dividing-warp *a* by means of the jacquard or equivalent therefor—as, for instance, when the shuttle carrying the maroon weft-thread is to be thrown the warp *a* is to be let down wherever that color is to appear on the top surface, so that the shuttle may pass over it, the shuttle passing under the other portions of the said warp *a*. The harness is then operated to bind in this weft by the second or binding in warp, *b*, and so with reference to the scarlet weft-thread carried by the other shuttle. In this way the maroon weft appears on some parts of the upper surface and on other parts of the under surface, and vice versa with the other weft-thread, and when the design changes to other colors the weft-thread must be colored to correspond.

By the means above specified the figure is produced without requiring a colored or party-colored warp, the same effect being produced as in figures produced on Brussels carpet, in which the jacquard selects and brings to the surface the peculiar color required for any part of the figure, there being as many sets of warps as there are colors composing the design. As the warps *b* are for binding in and are much finer than the dividing-warps *a*, the weft-threads are drawn down between the threads of the warps *a*, so that they are scarcely visible, and the weft-threads are thus thrown up in ribs on the warp-threads *a*, resembling the ranges of loops forming the Brussels pile, but running in a longitudinal instead of a transverse direction.

What I claim as my invention is—

The fabric substantially as herein described, produced by the double wefts, one or both of which is party-colored, in combination with the two sets of warps, one to divide and ingrain the wefts, and the other to bind in the wefts, substantially as and for the purpose specified.

JNO. G. MACNAIR.

Witnesses:

N. SCHOLFIELD,

H. M. SCHOLFIELD.